Jan. 31, 1939.     M. B. MAYER ET AL     2,145,661
HYDRAULIC BRAKE APPLIANCE
Filed July 1, 1937     2 Sheets-Sheet 1
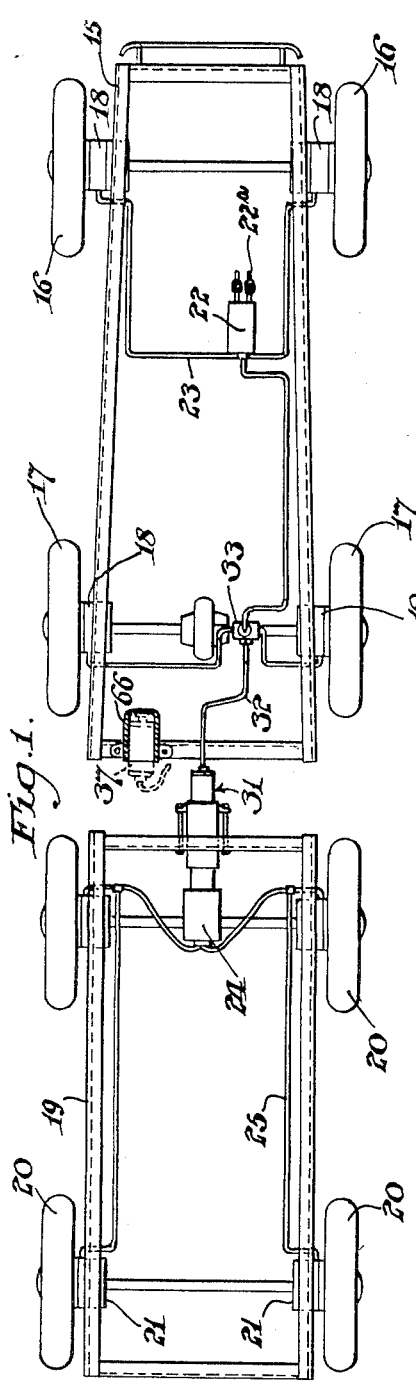
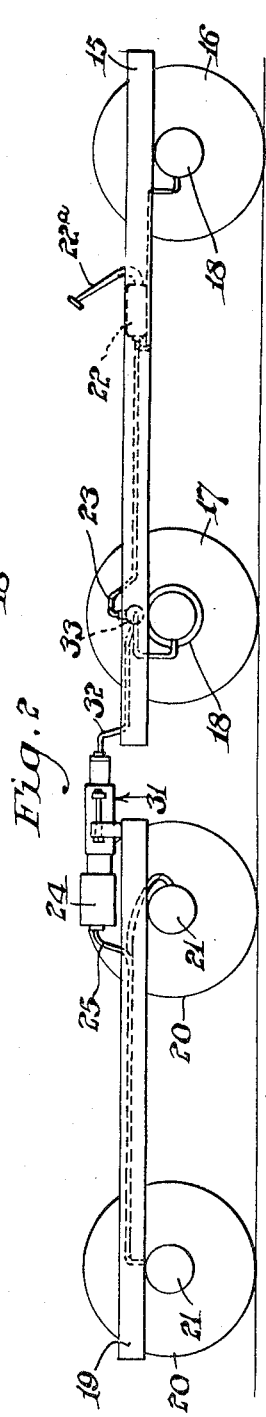
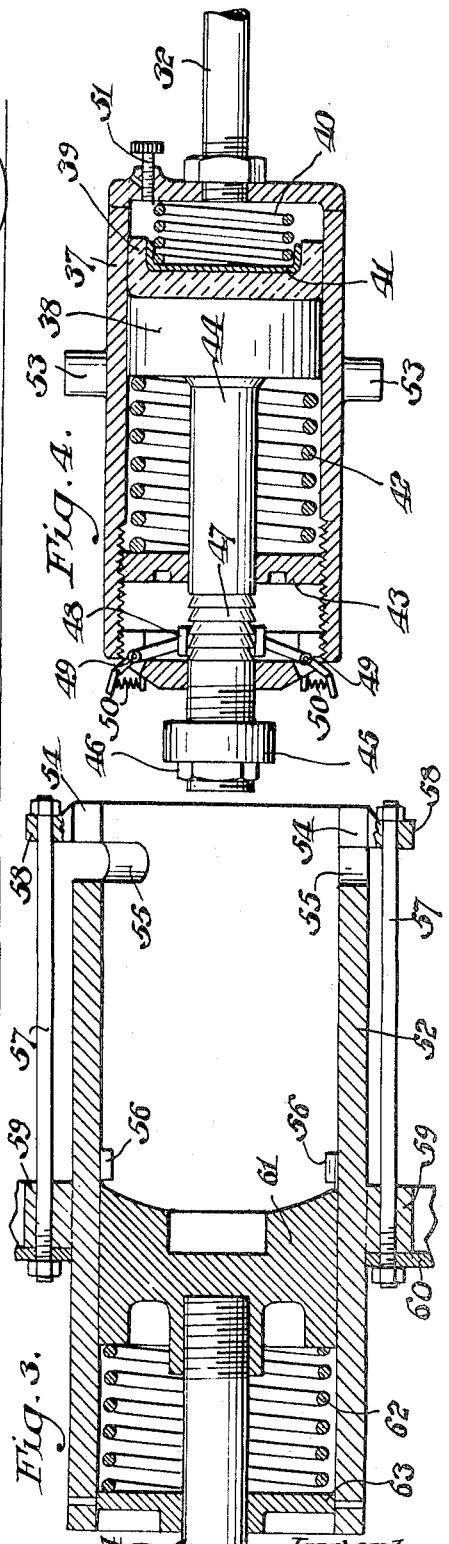
Inventors
Margeret B. Mayer
and Frederick S. James
By W. W. Williamson
Attorney

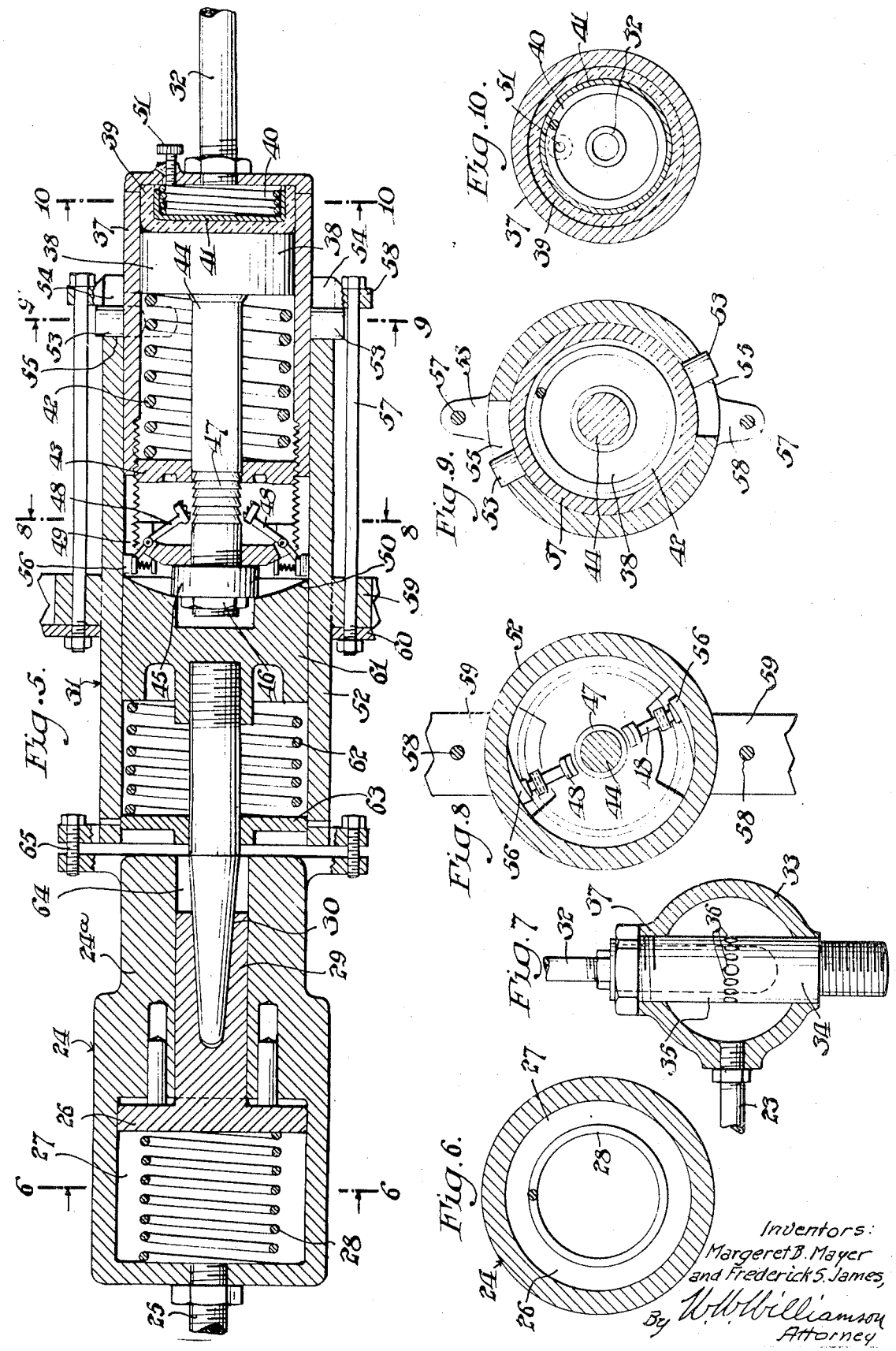

Patented Jan. 31, 1939

2,145,661

UNITED STATES PATENT OFFICE 2,145,661

HYDRAULIC BRAKE APPLIANCE

Margaret B. Mayer and Frederick S. James, Philadelphia, Pa.

Application July 1, 1937, Serial No. 151,392

5 Claims. (Cl. 188—3)

Our invention relates to a new and useful hydraulic brake appliance and has for one of its objects to provide a means for temporarily connecting the hydraulic brake system of a trailing vehicle or vehicles with the hydraulic brake system of a motor vehicle or tractor, whereby the brakes of all the vehicles will be operated by one primary actuating means without the loss of the desired safety factors such as an equal application of all brakes regardless of the weight load, an equal distribution of pressure upon all of the individual wheel brakes, and the elimination of erratic braking.

Another object of the invention is to provide a simple and effective device of this character embodying a low cost of installation, maintenance and upkeep, such device constituting means for connecting the hydraulic braking system of a tractor or motor vehicle with the braking system of a trailer or trailers.

Another object of the invention is to provide means for detachably connecting complete braking systems of two or more vehicles whereby the pressure in the brake system of the motor vehicle or tractor will be transmitted to the braking system of the trailing vehicle or vehicles.

Another object of the invention is to provide, in combination, the brake systems of two or more vehicles, each system including all of the elements of a hydraulic brake and means to couple the two systems together whereby an application of brake pressure in the tractor will be equally transmitted to the system or systems of the other vehicles.

Another object of the invention is to provide a coupling for the braking systems of a number of vehicles, which coupling comprises male and female or telescoping housings, said housings carrying plungers or pistons which will actuate in unison when the housings are coupled together, for transmitting pressure from one braking system to another.

Another object of the invention is to provide a coupling for connecting two or more braking systems, each of said systems including a master cylinder.

A further object of the invention is to provide means for holding the piston or plunger in the male housing in a predetermined position when disconnected from the female housing, said holding means being automatically released when the two housings are connected and permitted to resume the holding position when the housings are disconnected.

Another object of the invention is to provide means for adjusting the tension of the return spring in order to provide for any inequalities in transmitted braking pressures due to loss of braking fluid in the systems or unequal wear on the brakes of the connected vehicles.

A further object of the invention is to provide a receptacle for holding the male member of the coupling when disconnected.

A still further object of the invention is to provide a unique fitting for the connection between the male member of the coupling and the braking system of the vehicle of which said male member forms a part.

With the above and other objects in view, this invention consists of the details of construction and combination of elements hereinafter set forth and then designated by the claims.

In order that those skilled in the art to which this invention appertains may understand how to make and use the same, we will describe its construction, referring by numerals to the accompanying drawings forming a part of this application, in which:—

Fig. 1 is a diagrammatic plan view of a tractor and trailer illustrating an application of our hydraulic brake appliance.

Fig. 2 is a diagrammatic side elevation of the showing in Fig. 1.

Fig. 3 is a longitudinal sectional view of the female housing element of our coupling with a portion of the stem or piston rod broken away.

Fig. 4 is a similar view of the male housing element of the coupling.

Fig. 5 is a longitudinal sectional view of the coupling with the parts shown in their coupled relation and illustrating one manner of associating the coupling with a supplemental braking system including a master cylinder.

Fig. 6 is a section on the line 6—6 of Fig. 5.

Fig. 7 is a sectional elevation of the fitting used for connecting the male housing member with the brake system.

Fig. 8 is a section on the line 8—8 of Fig. 5.

Fig. 9 is a section on the line 9—9 of Fig. 5.

Fig. 10 is a section on the line 10—10 of Fig. 5.

In carrying out our invention as herein embodied 15 represents the chassis of a motor vehicle or tractor provided with front wheels 16 and rear wheels 17, each wheel being provided with a brake 18 including the usual cylinders and their appurtenances. While we have shown all of the wheels of the tractor provided with brakes, it will be obvious that only one pair may have brakes if so desired.

The chassis of the trailer or trailing vehicle is shown at 19 and may have one or more pairs of wheels designated by the numeral 20 and we have shown such trailer as having two pairs of wheels only for purposes of illustration. One or more pairs of the trailer wheels are provided with brakes 21 which, like the tractor, include the usual brake cylinders and other appurtenances.

Referring first to the tractor brake system, this is shown as including a master cylinder 22 which is of usual construction and supplied with a suitable brake fluid in the usual manner. The master cylinder being of usual construction, has a piston therein for displacing the fluid, which piston is actuated whenever desired by a pedal 22a. Connected with the master cylinder are suitable conduits 23 leading to the several brakes and these conduits may be arranged in any suitable manner so long as they communicate with the master cylinder, but generally there is a trunk conductor with branches leading therefrom.

The trailer 19 is also provided with a brake system, also including a master cylinder 24 with conduits 25 in communication with said master cylinder and with the brakes of any or all wheels of said trailer. As shown in Fig. 5 the master cylinder 24 includes a housing 24a having a plunger or piston 26 slidably mounted in the chamber 27 and normally urged towards a receded position by a spring 28. This piston is provided with a shank 29 or equivalent means for association with a part of the coupling to be presently described and said shank preferably has a tapered socket 30.

The coupling 31, by which two brake systems each on a separate vehicle are joined together, includes a male housing member 37 located at the rear of the vehicle on which it is mounted, with the interior of which communicates a flexible hose 32, which hose is connected with the brake system of the vehicle on which the male coupling member is mounted.

A convenient way of connecting said flexible hose to the brake system is to provide a four way fitting 33, Fig. 7, so that one of the conduits 23, as a trunk conduit, may be connected to one of the ports of said fitting, while two opposite ports may be used for connecting conduits 23 which lead directly to the rear wheel brakes. A bolt 34 passes through this fitting and may be threaded into the rear axle or differential housing or other suitable support. Said bolt has a chamber 35 therein to which holes 36 lead from the outer surface of the bolt, and these holes are located within the body of the fitting so that fluid may pass from the fitting into the bolt chamber and thence into the flexible hose 32 which is suitably attached to the open end of the chamber 35 at the head of the bolt.

In the housing 37 of the male member of the coupling is slidably mounted a piston 38 carrying a flexible cup washer 39 against which the fluid in the brake system operates for moving the piston 38 in one direction. Between the cup washer and the adjacent end of the housing 37 is located a spring 40 and if desirable a metal disc 41 may be interposed between the cup washer and said spring. Said spring 40 will function as a buffer for the piston and its component parts as said piston is retracted. The piston 38 is moved forwardly by the fluid in the brake system with which the male coupling member is connected each time the brake pedal 22a is actuated and the distance of the movement of said piston is in proportion to the movement given to the brake pedal and when said brake pedal is released so as to relieve the pressure on the piston 38, the latter is moved rearwardly towards its normal at rest position by the spring 42 in engagement with said piston and an adjustable apertured partition 43 having threaded connection with the housing 37.

The piston or plunger 38 carries a rod 44 which projects through the aperture in the adjustable partition 43 and on said piston rod 44 adjacent its outer end is screw-threaded a contact plate 45 which is held in an adjusted position by a lock nut 46. This piston rod is provided with a series of ratchet teeth 47 to be engaged by the heads of the pawls 48 pivoted to the housing 37 at 49, and said heads are urged towards the ratchet teeth by springs 50 coacting with the tails of the pawls. In order to relieve any air from the fluid chamber of the housing 37 a bleeder 51 may be provided.

The male member of the coupling is to be detachably connected with the female member or housing 52, and for convenience of illustration we have shown lugs 53 on the male member, which will enter the longitudinal portions 54 of the bayonet slots, and upon rotating the male housing 37 the said lugs 53 will enter the annular portions 55 of said bayonet slots. As the two members of the coupling are connected by the rotation of the male member 37, the tail pieces of the pawls 48 will ride on the cam lugs 56 and release the pawls from the ratchet teeth 47, thereby releasing the piston 38 so that it may move forwardly as occasion requires.

The housing 52 is suitably mounted on the forward end of the trailing vehicle as by bolts 57 through ears 58 and 59 or their equivalent formed on the housing 52 and through some suitable portion 60 of the trailing vehicle as shown in Figs. 3 and 5.

Within the housing 52 is a sliding piston 61 which is to be engaged by the end of the piston rod 44 or the contact plate 46, or both, so that under certain conditions the pistons 38 and 61 will operate in unison and said piston 61 is urged towards the outer end of its housing by a spring 62 engaging said piston and a guide 63 mounted in the housing 52. The piston rod or operating stem 64 is carried by the piston 61 and projects through the guide 63 for connection with a portion of a secondary brake system, for instance, said rod or stem 64 may engage a shank 29 and in fact the outer end of said rod 64 may be tapered to enter the socket 30. In order to retain the female housing in proper alignment with the master cylinder 24 on the trailing vehicle, said master cylinder and the female housing may be connected together by suitable fastening devices such as bolts 65 passing through ears or flanges on the members.

In lieu of connecting the piston rod 64 with the shank of the piston in the master cylinder, said piston rod 64 may be attached to or connected with any other operable element of the brake system, as for instance, the power lever of a mechanical brake system.

A receptacle 66, Fig. 1, is mounted on the rear of the vehicle which is equipped with the male housing member of the coupling and said receptacle has a chamber similar to the receiving end of the female housing of said coupling but said chamber is of sufficient size to receive the male housing without actuating the pawls or being engaged by the piston rod 44. Said receptacle 66 does have bayonet slots to receive the lugs 53. In other words, whatever means is used in the female member of the coupling to permit attachment of the male member thereto is duplicated in the receptacle.

It is to be particularly noted that the brake fluid is contained completely within each brake system of each vehicle whether tractor or trailer. With the brake systems of two or more vehicles coupled together by our device and the elements adjusted so there is equal displacement in all master cylinders and the housing of the male member of each coupling, the braking pressure can be equally distributed to the brakes of all wheels.

Upon application of force to the brake pedal 22a to move the same, fluid will be forced from the master cylinder 22 to cause a displacement of fluid in the conduits of the brake system of the tractor vehicle which will cause a movement of the piston 38 in proportion to the braking pressure applied to the wheel brakes of the tractor vehicle. The pressure thus exerted on the piston 38 will be transmitted through the piston rod 44 to the plunger 61 and through said plunger 61 and its rod 64 to the piston 26 of master cylinder 24 of the brake system of a trailer. The pressure exerted on the piston of said master cylinder 24 will be equal to that in the primary master cylinder 22 of the tractor vehicle. This will force fluid from the master cylinder 24 of the trailer and cause a displacement of fluid in the conduits of the trailer braking system to actuate the trailer wheel brakes under the same pressure as applied to the tractor vehicle wheel brakes.

From the foregoing it will be readily understood that we have provided an exceedingly simple and effective brake appliance wherein each vehicle has a complete braking system including a master cylinder and brake fluid never enters the female housing member of the coupling and therefore the displacement and travel of fluid in the trailer braking system is reduced to a minimum.

Of course we do not wish to be limited to the exact details of construction herein shown and described as these may be varied within the scope of the appended claims without departing from the spirit of our invention.

Having thus described our invention, what we claim as new and useful is:—

1. In a braking appliance of the character described, a trailer vehicle having a hydraulic braking system including a master cylinder with a plunger for displacing fluid, a coupling member comprising a housing attached to the master cylinder, a piston slidably mounted in said housing to be actuated in one direction by pressure in another braking system, a guide in said housing, means coacting with the guide and piston to urge the latter in the opposite direction, a rod carried by said piston for transmitting motion from the piston in the coupling housing to the plunger of the master cylinder, and coupling means on the end of the housing opposite the one where the piston rod is located.

2. In a vehicle brake appliance, a leading vehicle having a hydraulic braking system including means to produce pressure therein, a coupling member comprising a housing, a piston slidably mounted in said housing, a spring pressed flexible cup washer engaged with the piston, means to connect one end of the housing with the above mentioned braking system whereby when pressure is produced in said braking system the piston will be moved forwardly, a spring to urge said piston rearwardly, a piston rod carried by the piston and projecting from the opposite end of the housing, a trailing vehicle having a braking system, a coupling member of the trailing vehicle and comprising a housing for detachable connection with the housing of the other coupling member, a plunger in the housing of the trailing vehicle coupling member for coaction with the piston rod of the first mentioned coupling member a rod carried by said plunger and connected with the braking system of the trailing vehicle, and means to urge said plunger outward.

3. The structure in claim 2, in combination with means to adjust the tension of the spring which urges the piston against the action of the hydraulic pressure.

4. In hydraulic brake appliance for tractor and trailer the combination of a male housing connected with the braking system of the tractor, a piston therein, a piston rod carried by said piston and projecting from an end of the male housing, ratchet teeth on said piston rod, pawls pivoted on the male housing and having heads for coaction with the ratchet teeth to hold the piston in a receded position; said pawls having free tail ends, means to urge the pawls into engagement with the ratchet teeth, a female housing mounted in the trailer to receive the male housing, means for detachably connecting said housings, a plunger in said female housing to be acted upon by the piston rod, means to urge the plunger towards the piston rod, means in the female housing for coaction with the tail ends of the pawls to release them from the ratchet teeth as the housings are coupled together, a rod carried by the plunger, and a hydraulic braking system including a master cylinder on the trailer and having a plunger with which the last mentioned rod coacts to produce pressure in the trailer braking system.

5. The structure in claim 4 wherein the means for releasably actuating the pawls consists of cam lugs in the path of travel of the tail ends of the pawls during the final coupling actions.

MARGARET B. MAYER.
FREDERICK S. JAMES.